(12) United States Patent
Barrow et al.

(10) Patent No.: US 11,498,870 B2
(45) Date of Patent: Nov. 15, 2022

(54) EXTRUDED PLASTIC AGGREGATE FOR CONCRETE

(71) Applicant: MNZ HOLDINGS LIMITED, Auckland (NZ)

(72) Inventors: Peter Barrow, Auckland (NZ); Andrew Ferrier; Peter Hutchinson, Auckland (NZ)

(73) Assignee: ENVIROPLAZ INTERNATIONAL HOLDINGS LIMITED, Wanchai (HK)

( * ) Notice: Subject to any disclaimer, the term of this patent is extended or adjusted under 35 U.S.C. 154(b) by 874 days.

(21) Appl. No.: 15/529,388

(22) PCT Filed: Nov. 24, 2015

(86) PCT No.: PCT/IB2015/059106
§ 371 (c)(1),
(2) Date: May 24, 2017

(87) PCT Pub. No.: WO2016/084007
PCT Pub. Date: Jun. 2, 2016

(65) Prior Publication Data
US 2017/0260093 A1 Sep. 14, 2017

(30) Foreign Application Priority Data

Nov. 24, 2014 (NZ) ...................................... 702277

(51) Int. Cl.
*B29C 48/04* (2019.01)
*C04B 18/20* (2006.01)
(Continued)

(52) U.S. Cl.
CPC .............. *C04B 18/20* (2013.01); *B29C 48/00* (2019.02); *B29C 48/04* (2019.02); *B29C 48/12* (2019.02);
(Continued)

(58) Field of Classification Search
CPC ....... B29C 48/00; B29C 48/022; B29C 48/04; B29C 48/911; B29C 48/345; B29C 48/30; B29C 2948/92876; B29C 2948/92704
(Continued)

(56) References Cited

U.S. PATENT DOCUMENTS 5,051,285 A 9/1991 Borzakian
5,372,765 A 12/1994 Chen et al.
(Continued)

FOREIGN PATENT DOCUMENTS

EP 1 598 164 A1 11/2005
JP 11-147739 A 6/1999
(Continued)

OTHER PUBLICATIONS

English abstractor KR2006004110A (Year: 2006).*
(Continued)

*Primary Examiner* — Jeffrey M Wollschlager
*Assistant Examiner* — Xue H Liu
(74) *Attorney, Agent, or Firm* — McCormick, Paulding & Huber PLLC

(57) ABSTRACT

The invention generally relates to a method of making a plastic aggregate, and its use to make concrete products. The aggregate is formed by providing a granulated waste plastic material, introducing the granulated waste plastic material into an extruder having a die, the die having a ratio of die nozzle open area to die land area of about 1:10 to about 1:40, and extruding the granulated waste plastic material through the extruder to generate an extruded plastic aggregate. The method can include the presence of controlled cooling, the addition of additives and treatment of the surface of the aggregate to produce a desired aggregate that can be used to make a concrete product with desired properties, such as compressive strength and weight.

18 Claims, 7 Drawing Sheets

(51) Int. Cl.

| | |
|---|---|
| *B29C 48/88* | (2019.01) |
| *C04B 28/02* | (2006.01) |
| *C04B 18/02* | (2006.01) |
| *B29C 48/00* | (2019.01) |
| *B29C 48/12* | (2019.01) |
| *C04B 20/02* | (2006.01) |
| *C04B 20/10* | (2006.01) |
| *C04B 28/04* | (2006.01) |
| *B29K 105/26* | (2006.01) |
| *B29B 17/00* | (2006.01) |
| *C04B 111/00* | (2006.01) |
| *C04B 111/60* | (2006.01) |
| *B29C 48/345* | (2019.01) |
| *B29K 105/00* | (2006.01) |
| *B29K 509/00* | (2006.01) |

(52) U.S. Cl.
CPC .......... *B29C 48/911* (2019.02); *C04B 18/022* (2013.01); *C04B 20/02* (2013.01); *C04B 20/026* (2013.01); *C04B 20/1055* (2013.01); *C04B 28/02* (2013.01); *C04B 28/04* (2013.01); *B29B 17/0026* (2013.01); *B29C 48/022* (2019.02); *B29C 48/345* (2019.02); *B29C 2948/92704* (2019.02); *B29C 2948/92876* (2019.02); *B29K 2105/0047* (2013.01); *B29K 2105/26* (2013.01); *B29K 2509/00* (2013.01); *C04B 2111/0075* (2013.01); *C04B 2111/60* (2013.01); *Y02W 30/62* (2015.05); *Y02W 30/91* (2015.05)

(58) Field of Classification Search
USPC .......................................................... 264/129
See application file for complete search history.

(56) References Cited

U.S. PATENT DOCUMENTS

| | | |
|---|---|---|
| 5,472,498 A | 12/1995 | Stephenson et al. |
| 5,702,199 A | 12/1997 | Fishback et al. |
| 6,000,877 A | 12/1999 | Fishback et al. |

FOREIGN PATENT DOCUMENTS

| | | |
|---|---|---|
| JP | 2001-089209 A | 4/2001 |
| JP | 2003-39431 A | 2/2003 |
| JP | 2007-203486 A | 8/2007 |
| KR | 2013-0099526 A | 9/2013 |
| WO | 94/08912 A2 | 4/1994 |
| WO | 01/55051 A1 | 8/2001 |
| WO | 2014/007648 A1 | 1/2014 |

OTHER PUBLICATIONS

Min, K., White, J. and Fellers, J., "Development of Phase Morphology in Incompatible Polymer Blends during Mixing and its Variation in Extrusion," Polymer Engineering and Science, Mid—Dec. 1984, vol. 24, No. 17, pp. 1327-1336.

Saikia, N. and de Brito, J., "Use of Plastic Waste as Aggregate in Cement Mortar and Concrete Preparation: A Review," Construction and Building Materials, Feb. 2012, pp. 385-401.

International Search Report for PCT Serial No. PCT/IB2015/059106 dated Feb. 22, 2016.

Slaubaugh, S. et al., "Development and Properties of Foamed Synthetic Lightweight Aggregates," 2007 World of Coal Ash (WOCA), May 7-10, 2007, Northern Kentucky, USA [Retrieved from the Internet Feb. 10, 2016] ,URL: http://www.flyash.info/2007/144swan.pdf> Section 2.2.1, 3.0 Materials and Procedures.

* cited by examiner

EXTRUDED PLASTIC AGGREGATE FOR CONCRETE

CROSS-REFERENCE TO RELATED APPLICATIONS

This application is a National Stage application of International Patent Application No. PCT/162015/059106, filed on Nov. 24, 2015, which claims priority to New Zealand Patent Application No. 702277, filed on Nov. 24, 2014, each of which is hereby incorporated by reference in its entirety.

TECHNICAL FIELD

The present invention relates to the production of a plastic aggregate from waste plastic material by extrusion, and more particularly, to its use as an at least partial replacer for aggregate in concrete production.

BACKGROUND

The use of plastics in concrete is known, but leads to concrete with low compressive and/or tensile strength, and can suffer from deterioration through the alkali-silica reaction (ASR) which results from the use of waste plastics that contain sugar residues (i.e. from sweet drinks).

Light weight aggregate concrete may be used to reduce dead loads making savings in foundations and reinforcement, improving thermal properties, reduces spalling and reducing the need for formwork and propping. However, as mentioned above often light weight concrete may have a relatively low strength compared to concrete made with traditional materials.

It is an object of the present invention to provide a plastic aggregate which at least provides the public with a useful choice.

SUMMARY

In a first aspect the present invention relates to a method of making a plastic aggregate, the method comprising
    providing a granulated waste plastic material,
    introducing the granulated waste plastic material into an extruder having a die, the die having a ratio of die nozzle open area to die land area of about 1:10 to about 1:40, and
    extruding the granulated waste plastic material through the extruder to generate an extruded plastic aggregate.

In a further aspect the present invention relates to a method of manufacturing an extruded plastic aggregate for use in a concrete product that, in use, enables production of a concrete product having a desired compressive strength, the method comprising
    providing a granulated waste plastic material,
    introducing the granulated waste plastic material into an extruder having a die, the die having a ratio of die nozzle open area to die land area of about 1:10 to about 1:40,
    extruding the granulated waste plastic material through the extruder to generate an extruded plastic aggregate,
    treating the extruded plastic aggregate by
        i) cooling the extruded plastic aggregate, or
        ii) coating the plastic aggregate, or
        iii) both (i) and (ii)
    to provide the extruded plastic aggregate for use in the concrete product.

In a further aspect the present invention relates to a method of manufacturing an extruded plastic aggregate for use in a concrete product that, in use, enables production of a concrete product having a desired compressive strength, the method comprising
    providing a granulated waste plastic material,
    introducing the granulated waste plastic material into an extruder having a die, the die having a ratio of die nozzle open area to die land area of about 1:10 to about 1:40,
    extruding the granulated waste plastic material through the extruder to generate an extruded plastic aggregate,
    treating the extruded plastic aggregate by
        i) controlling the rate of cooling of the extruded plastic aggregate, or
        ii) coating the plastic aggregate, or
        iii) both (i) and (ii)
    to provide the extruded plastic aggregate for use in the concrete product.

In a further aspect the present invention relates to a method of making concrete, the method comprising
    providing an extruded plastic aggregate from granulated waste plastic material, the extruded plastic aggregate being produced in an extruder having a ratio of die nozzle open area to die land area of about 1:10 to about 1:40,
    combining about 18 to about 60% by weight cement, about 5 to about 50% by weight water and about 5 to about 40% by weight extruded plastic aggregate to form an aggregate-concrete mixture.

In a further aspect the present invention relates to a method of making concrete, the method comprising
    providing an extruded plastic aggregate from granulated waste plastic material, the extruded plastic aggregate being produced in an extruder having a ratio of die nozzle open area to die land area of about 1:10 to about 1:40,
    combining about 18 to about 60% by weight cement, about 5 to about 50% by weight water and about 5 to about 40% by weight extruded plastic aggregate to form an aggregate-concrete mixture,
    wherein the aggregate-concrete mixture provides a concrete having a compressive strength of at least about 10 to about 50 MPa.

In a further aspect the present invention relates to a plastic aggregate as an at least partial replacement for metal aggregate in concrete, the plastic aggregate having one or more of the features selected from,
    a size of about 1 to about 30 mm, and
    a specific gravity of about 0.90 to about 1.15, and
    a surface texture that is roughened and has a high surface area to promote both mechanical and/or molecular bonding; and
    wherein when in use in a concrete composition, the plastic aggregate has a high bond strength within the concrete mixture, the concrete mixture having a compressive strength of about 10 to about 50 MPa.

Any of the following embodiments may relate to any of the above aspects in any combination.

In one embodiment the concrete comprises about 5, 10, 15, 20, 25, 30, 35 or 40% by weight of the extruded plastic aggregate, and useful ranges may be selected between any of these values.

In various embodiments, the land length of the die may be about 10, 15, 20, 25, 30, 35, 40, 45, 50, 55, 60, 65 and 70 mm, and useful ranges may be selected between any of these values.

In various embodiments, the land length of the die may be about 10 to about 40 mm, and useful ranges may be selected between any of these values.

In one embodiment, the land length of the die is about 20 mm.

In one embodiment, the land length of the die creates an extruded plastic aggregate with a highly textured or roughened surface.

In one embodiment, the granulated waste plastic material is heated at a temperature within the extruder of about 120, 130, 140 150, 160, 170, 180, 190, 200, 210 or 220° C.

In one embodiment, during the extrusion process at least 60, 65, 70 75, 80, 85, 90 or 95% of the granulated waste plastics material becomes molten.

In one embodiment, the granulated waste plastics material has a particle size of about 1 to about 30 mm.

In one embodiment, the granulated waste plastics material has a particle size of less than 3 mm.

In one embodiment, the method further comprises a step of cooling the extruded plastic aggregate after or during egress from the die.

In one embodiment, the cooling is carried out by contacting the aggregate with a high thermal capacity liquid. In one embodiment the liquid is water In one embodiment the method of making a concrete with desired properties includes the desired properties of any one or more of compressive strength, density and weight.

In one embodiment the desired property of the concrete product is compressive strength.

In one embodiment the desired property of the concrete product is density.

In one embodiment the desired property of the concrete product is weight.

In one embodiment, the cooling is carried out by spraying a high thermal capacity liquid onto the extruded plastic aggregate. In one embodiment the liquid is water.

In one embodiment, the cooling is carried out by contacting the aggregate with air. In one embodiment the air is at ambient temperature.

In one embodiment contact of the aggregate with water provides controlled rapid cooling.

In one embodiment contact of the aggregate with air provides controlled slow cooling.

In one embodiment the rate of cooling defines the presence of void spaces in the aggregate.

In one embodiment rapid cooling of the aggregate leads to the presence of void spaces in the aggregate.

In one embodiment slow cooling of the aggregate leads to the absence, or substantial absence, of void spaces in the aggregate.

In one embodiment, the method further comprises the step of providing polar substances to the surface of the extruded plastic aggregate to improve an interface between the extruded plastic aggregate and a concrete mixture when the extruded plastic aggregate is added to a concrete mixture.

In an alternative embodiment the extruded plastic aggregate is treated to increase the surface energy of the aggregate. In preferred forms the extruded plastic aggregate is plasma treated. For example, by the use of flame treatment.

In one embodiment, the method further comprises the step of further cooling the extruded plastic aggregate using both air and a controlled cooling aid, to promote uniform gas cell structure of the extrudate to achieve a specific gravity of about 0.80, 0.90, 0.91, 0.92, 0.94, 0.96, 0.98, 1.00, 1.02, 1.04, 1.06, 1.08 and 1.10, 1.11, 1.12, 1.13, 1.14, 1.15, and useful ranges may be selected between any of these values.

In one embodiment the controlled cooling aid is a pozzolanic material. Preferably the pozzolanic material is fly ash.

In one embodiment, the method further comprises the step of leaving a thin layer of the pozzolanic material fused into the surface of the extruded plastic aggregate after cooling.

In one embodiment, the extruder is a single rotational axis extruder.

In one embodiment, the extruder is a food extruder.

In one embodiment, the extruder runs about 300 to about 400 revolutions per minute.

In one embodiment, the extruding surface of the die comprises at least 3 surfaces. In some embodiments the die is substantially star shaped.

In one embodiment the volume of the extruder is greater than at least 6, 7, 8, 9, 10, 11, 12, 13, 14, 15 tonne per hour.

In one embodiment, the method further comprises the step of providing one or more additives to the extruding mixture. Examples of suitable additives include but are not limited to sand, fly ash, calcium carbonate, ground pozzolanic materials and/or glass fines, glass powder or glass granulates. Other examples of suitable additives include but are not limited to mineral, metallic, wood flour, paper and food cereal by-products in the form of fines, powders or granules.

In one embodiment the additive is added to the extruding mixture in an amount of at least about 1, 5, 10, 15, 20, 25, 30, 35 or 40% by weight of the extruded plastic aggregate, and useful ranges may be selected between any of these values.

In one embodiment, the method comprises the step of providing sand to the extruding mixture. In one embodiment the sand is added into the extruder in a low pressure section of the extruder.

In one embodiment the method further comprises the step of adding glass particles into the extruder. In one embodiment the glass particles are added at the beginning of the extruding process.

In one embodiment, the method further comprises the step of providing the plastic aggregates as described above.

In one embodiment, the extruded plastic aggregate comprises a high surface area to volume ratio.

In one embodiment, for an about 20 mm aggregate the extruded plastic aggregate comprises a surface area to volume ratio of about 1, 1.1, 1.2, 1.3, 1.4, 1.5, 1.6, 1.7, 1.8 or 1.9, and useful ranges may be selected between any of these values.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

The term "comprising" as used in this specification and claims means "consisting at least in part of". When interpreting statements in this specification and claims which include that term, the features, prefaced by that term in each statement, all need to be present but other features can also be present. Related terms such as "comprise" and "comprised" are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

BRIEF DESCRIPTION OF THE DRAWINGS

The invention will now be described by way of example only and with reference to the drawings.

DETAILED DESCRIPTION

Figure 1:
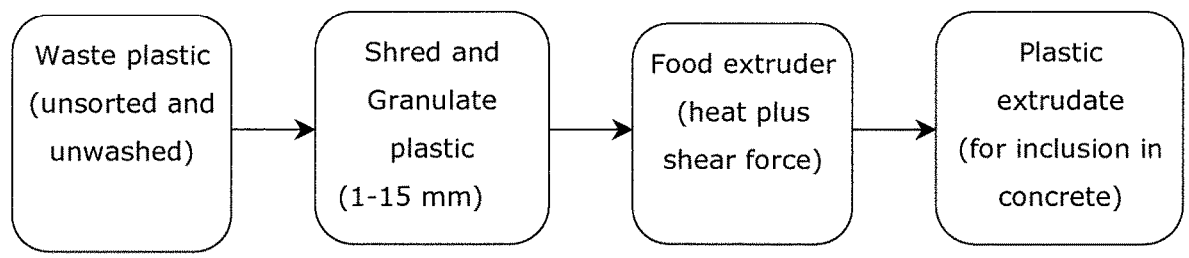
FIG. 1 shows a schematic of the steps of the process of the present invention to produce an extruded plastic aggregate for use in concrete.

The present invention relates to the production of a plastic aggregate for use in the manufacture of concrete. The method generally includes the steps of providing a granulated waste plastics material, introducing the granulated waste plastics into an extruder that has a ratio of die open area to die land area of about 1:10 to about 1:40, and then extruding the granulated plastic material through the extruder to generate the extruded plastic aggregate.

Typically in the plastics industry, extrusion of plastic has focused on products having a smooth and/or uniform surface texture or covering.

The present invention is directed to an extruded aggregate having an irregular surface.

1. Source Material

The source material for use in the invention is waste plastic material. Such material is typically a heterogeneous mixture of co-mingled plastic. For example, the material may be a mixture of plastic waste materials that are typically disposed from residential and commercial premises for recycling. For example, milk bottles, plastic drink bottles (many of which contain sugary drinks), plastic containers, plastic packaging etc.

The waste plastic material may comprise polyolefins, for example high, medium and/or low density polyethylene, polypropylene or polyethylene terephthalate and/or may comprise other plastics, for example unplasticised polyvinyl chloride, plasticised polyvinyl chloride, polystyrene, acetonitrile butadiene styrene and polyurethane.

The use of waste plastics as a source material for the extruded plastic aggregate provides another use for plastics that would otherwise be sent to landfill. Typically waste plastics must be put through a series of washing processes before it is able to either be put through an extruder or be used in concrete. This is due to the impurities and left-over residue from the waste plastics previous use. However, in the present invention the waste plastic does not require extensive cleaning. For example, while it is desired to remove large organic particles, there is no requirement for the plastic to be cleaned to remove, for example, residual sugars that remain from sugary drinks containers.

The waste plastic is first shredded to a particle size of about 10 to about 200 mm, and preferably about 50 mm. This shredded plastics material is then granulated to a particle size of about 1, 2, 3, 4, 5, 6, 7, 8, 9, 10, 11, 12, 13, 14, 15 mm, and useful ranges may be selected between any of these values (for example, from about 1 to about 15, about 1 to about 13, about 1 to about 12, about 1 to about 10, about 1 to about 9, about 1 to about 8, about 1 to about 7, about 1 to about 5, about 1 to about 4, about 2 to about 15, about 2 to about 14, about 2 to about 10, about 2 to about 8, about 2 to about 7, about 2 to about 5, about 3 to about 16, about 3 to about 13, about 3 to about 11, about 3 to about 9, about 3 to about 7, about 3 to about 5, about 4 to about 15, about 4 to about 12, about 4 to about 10, about 4 to about 8, about 4 to about 6, about 5 to about 15, about 5 to about 13, about 5 to about 11, about 5 to about 9, about 5 to about 7, about 6 to about 15, about 6 to about 12, about 6 to about 10, about 6 to about 9, about 8 to about 15, about 8 to about 14, about 8 to about 12, about 8 to about 10, about 9 to about 15, about 9 to about 14, about 9 to about 12, about 9 to about 11, about 10 to about 15, about 10 to about 14, about 10 to about 12, about 11 to about 15, about 11 to about 13, about 12 to about 15, about 12 to about 14 or about 13 to about 15 mm).

2. Extrusion Process

The present invention uses an extrusion process to produce the extruded plastic aggregate. The general method is shown in FIG. 1.

The extrusion method comprises the steps of providing a granulated waste plastic material, introducing the granulated waste plastic material into an extruder that has a ratio of die open area to die land area of about 1:10 to about 1:40, and extruding the granulated waste plastics material through the extruder to generate the extruded plastic aggregate.

During the extrusion a portion at least of the granulated waste plastics material becomes molten during extrusion. In one embodiment, during the extrusion process at least 60, 65, 70, 75, 80, 85, 90 or 95% of the granulated waste plastics material becomes molten.

2.1 Extruder Set-Up

The extruded plastic aggregate is formed by an extruder. Suitable extruder may include plastics and cooking extruders.

In one embodiment the extruder is of a cooking extruder type. Such a food extruder is typically an auger type screw within a barrel, which forces raw material through a restrictive die plate to extrude, in this case, waste plastic to make plastic aggregates or a plastics aggregate.

An advantage of a food extruder compared that to a typical plastics extruder is that it operates at a higher throughput, at a lower cost and provides greater scalability than a plastic extruder. In some embodiments the velocity of the extruded plastic aggregate exiting the die is about 0.02 to about 0.04 m/s.

In one embodiment, the extruder operates at about 300 to 400 revolutions per minute.

Although extrusion can be used to describe a range of processes through which material is forced through a restriction point, generally speaking the extrusion process most often describes an auger type screw within a barrel, which forces raw material through a restrictive die plate. The process is used in a wide variety of applications including food/feed processing, polymers and aluminium to name a few.

Food and feed extruders are loosely termed cooking extruders. They develop heat required to reach ideal process conditions by developing shear (friction) generated through product slippage/resistance to flow of raw material against the screw and to a lesser extent use of thermal inputs (both heating and cooling) from jacketed barrels when required. The screw profiles are often complex and reflect different points within the barrel where higher or lower amounts of shear are required for any given product.

Traditional mineral polymer extrusion on the other hand relies more heavily on thermal input (heat), with minimal variation in screw profile along the length of the screw. Although shear development forms part of melt process, it is to a lesser degree than food/feed extrusion and rheology is somewhat less complex.

In one embodiment of the present invention, waste or recycled plastic is processed through a single screw cooking extruder, using a screw profile commonly used for making high density animal feeds.

Full melt of the waste plastics is achieved through utilising high shear conditions and by manipulating die restriction. Specific mechanical energy can be optimised in order to achieve melt with or without external thermal inputs.

The extruder develops heat by developing shear (friction) generated through product slippage/resistance to flow of raw material against the screw, as well as the extruder barrel being heated also. The screw profiles are complex and reflect different points within the barrel where higher or lower amounts of shear are required for any given product.

The type of cooking extruder used in the making of the present invention may considerably vary.

Some of their variables may include
single or multi screw,
long or short barrel,
jacketed or unjacketed,
continuous flight screw or segmented screw element, or
fixed speed or variable speed.

In one embodiment, the extruder system comprises a long barrel (8 head), steam jacketed, variable pitch element, variable speed, single screw extruder.

In one embodiment the extruder is a single screw extruder.
In a preferred embodiment the extruder is a food extruder.
In one embodiment the source material is fed into the extruder via a hopper.

2.2 Extruder Die

The inventors have determined that a particular extruded die set-up is important for producing acceptable extruded plastic aggregates. The die cross section and land length are variables of the extrusion process to create an effective product.

Figure 3:
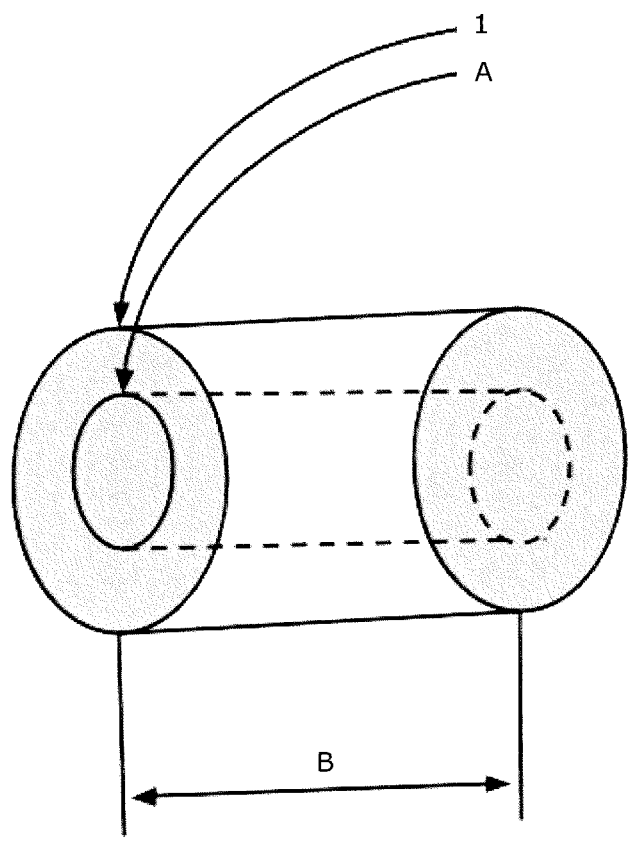
FIG. 3 shows a diagram of a die, showing the nozzle open area (A) and land length (B). The land area is determined by multiplying the circumference of the nozzle by the land length.

FIG. 3 shows a figure of a die 1. The die 1 includes a nozzle A and has a length known as the land length B. The cross section of the nozzle is the open wall area. The land length is the length of the die running in the direction parallel with the screw.

In one embodiment, the ratio of die nozzle area to land area (circumference of the nozzle A multiplied by the land length B) is 1 to about 10, 15, 20, 25, 30, 35, 40, 45, 50, 55, 60, 65 or 70, and useful ranges may be selected between any of these values (for example, from about 1:10-70, about 1:10-60, about 1:10-50, about 1:10-40, about 1:10-30, about 1:10-20, about 1:15-70, about 1:15-60, about 1:15-50, about 1:15-40, about 1:15-35, about 1:15-30, about 1:15-25, about 1:20-70, about 1:20-65, about 1:20-60, about 1:20-45, about 1:20-40, about 1:20-35, about 1:20-30, about 1:20-25, about 1:25-70, about 1:25-60, about 1:25-40, about 1:25-35, about 1:25-30, about 1:30-70, about 1:30-60 or about 1:30-40).

It has been found that an open nozzle area A to land area (circumference of the nozzle A multiplied by the land length B) of 1:10 to 1:40 creates a highly textured surface. This textured surface has the required surface roughness and or surface area for the plastics aggregate to form a good chemical and/or mechanical bond with the concrete mix.

In one embodiment, the land length of the die is about 10, 15, 20, 25, 30, 35, 40, 45, 50, 55, 60, 65 and 70 mm, and useful ranges may be selected between any of these values (for example, from 10 to about 70, about 10 to about 65, about 10 to about 60, about 10 to about 50, about 10 to about 40, about 10 to about 30, about 15 to about 70, about 15 to about 65, about 15 to about 55, about 15 to about 40, about 15 to about 30, about 20 to about 70, about 20 to about 65, about 20 to about 55, about 20 to about 45, about 25 to about 70, about 25 to about 60, about 25 to about 50, about 25 to about 40, about 30 to about 70, about 30 to about 65, about 30 to about 50, about 30 to about 45, about 40 to about 70, about 40 to about 65, about 40 to about 55 or about 55 to about 70 mm).

In one embodiment, the land length of the die is about 20 mm.

It should be appreciated that a range of die shapes will work effectively with a die land length as described above. For example, a small "pea"-shaped plastic aggregate may be produced effectively with a 20 mm land length. A pea plastics aggregate die shape may have a diameter of 5 mm or less.

Without wishing to be limited by theory, the use of very long land length dies, compared to typical food extrusion, causes an extended period of surface drag within the die, leading to distinct changes in flow speed from the centre of the die when compared with the edge, leading to surface irregularities on die exit.

2.3 Screw Shape

The screw profile used contained an initial feed section with long pitch single flight screws.

Following the initial feed section is the central section where shear is maximised with a twin flight compression screw and lobe screw followed by highly restrictive choke plate.

This high shear point causes maximum mixing and heat development, leading to majority of raw material reaching melt phase before entering the final section of screw.

The final section is a long pitch single flight, providing a lower shear dwell phase during which temperature continues to peak and full melt occurs.

A final conical triple flight compression screw enables complete screw fill and uniform high pressure to be maintained at the die.

Shear locks are required in the extruder to create high pressure restrictions through which gas cannot escape. Gases otherwise take the path of least resistance, back tracking out the extruder throat (inlet) and disrupting the flow of material, or even preventing forward flow altogether (particularly in single screw machines).

2.4 Die Shape

The die shape used with the present invention contributes towards the production of an extruded plastic aggregate having a texturalised surface.

As discussed, there is an advantage to the production of extruded plastic aggregates lacking substantive planar regions, as the presence of planar regions can promote stress planes within the product in which the extruded plastic aggregate has been incorporated.

Die shapes of use in the present invention that lead to an extruded plastic aggregate with a texturalised surface are generally based on a non-regular shape. For example, a regular shape such as a circle or oval will lead to a extruded plastic aggregate having a low-texturalised surface. Products made from such an extruded plastic aggregate may have increased number of stress planes and a resultant lower tensile strength.

Figure 4:
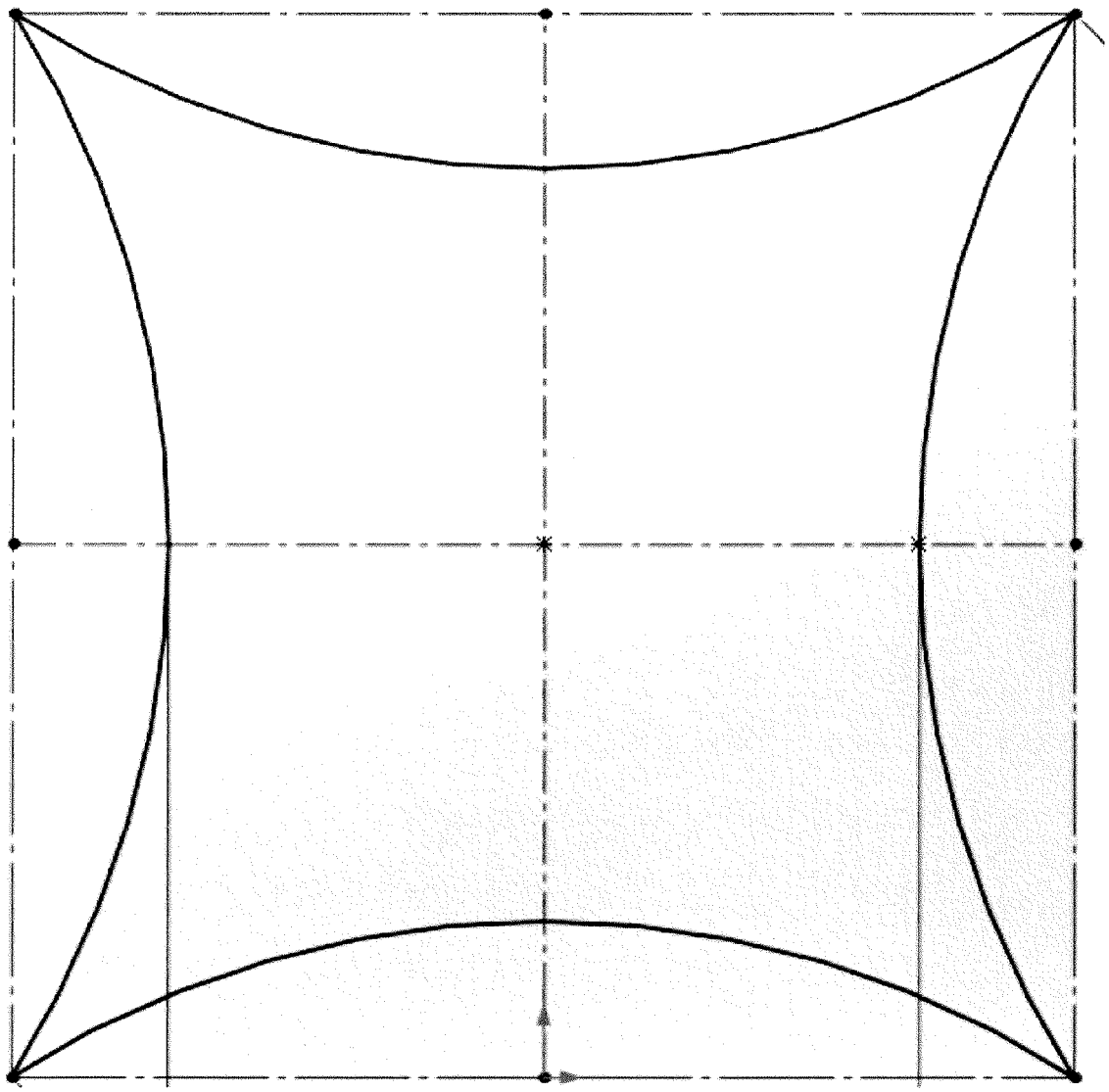
FIG. 4 shows an example of a die design for use in an extruder to produce an extruded plastic aggregate of the present invention.
Figure 8:
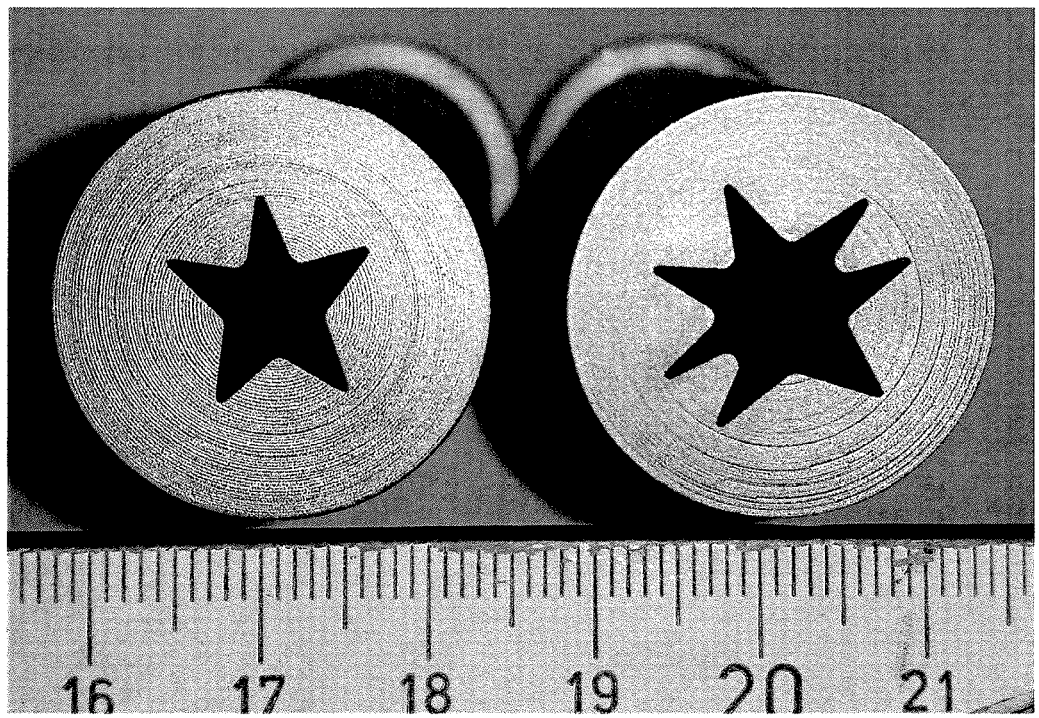
FIG. 8 shows exemplary die shapes that can be used for the extrusion of the plastic aggregates of the invention.

The die shape can have a non-regular shape that includes a number of vertices. As shown in FIG. 4 is a die shape with four vertices. FIG. 8 shows two dies with a "star" shape In one embodiment the die shape is one with more than at least 2, 3, 4, 5, 6, 7, 8, 9, 10, 11, 12 vertices. For example, a triangular die shape has 3 vertices, a square 4, etc.

Figure 9:
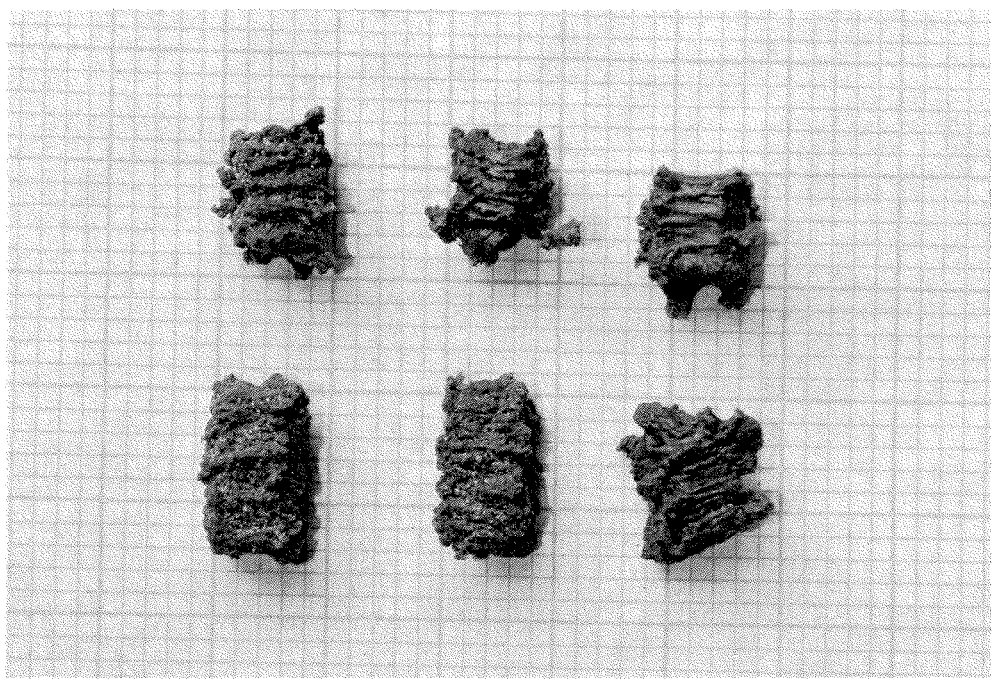
FIG. 9 shows finished aggregate products from a 10/5 star form die (2 mm scale).
Figure 10:
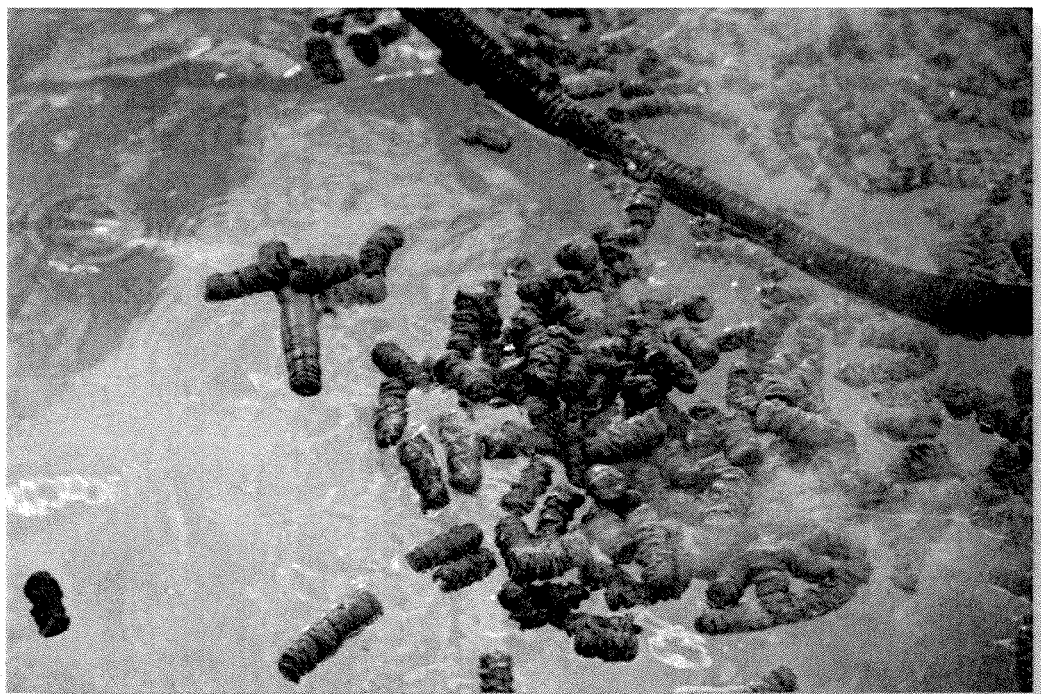
FIG. 10 shows 8 mm diameter extrudate with variable surface texturalisation in water.
Figure 11:
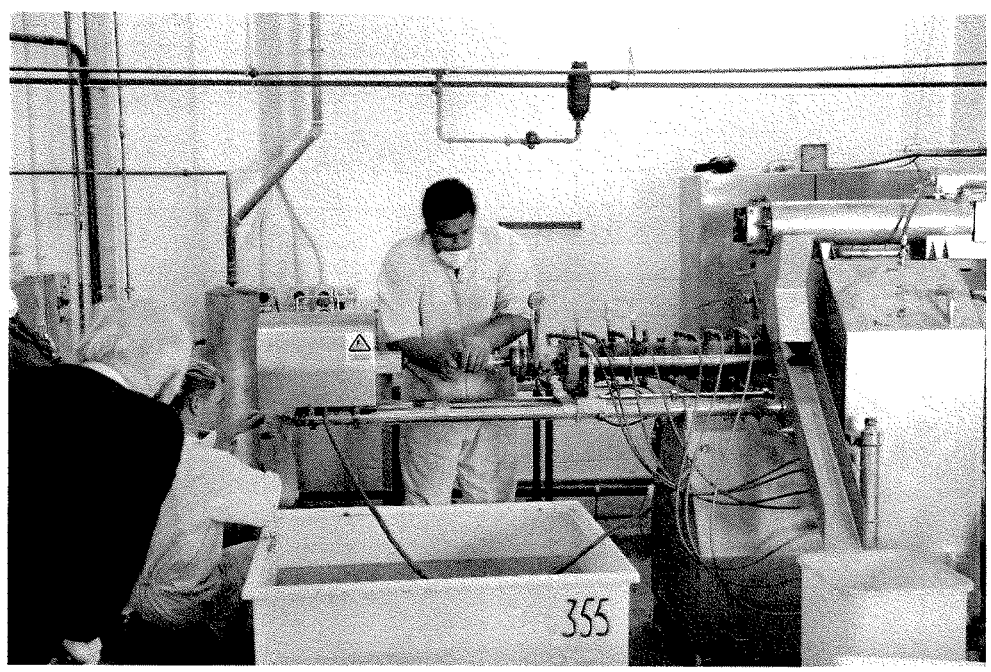
FIG. 11 shows an extruder set-up with a catch bin in place to receive the extrudate.
Figure 12:
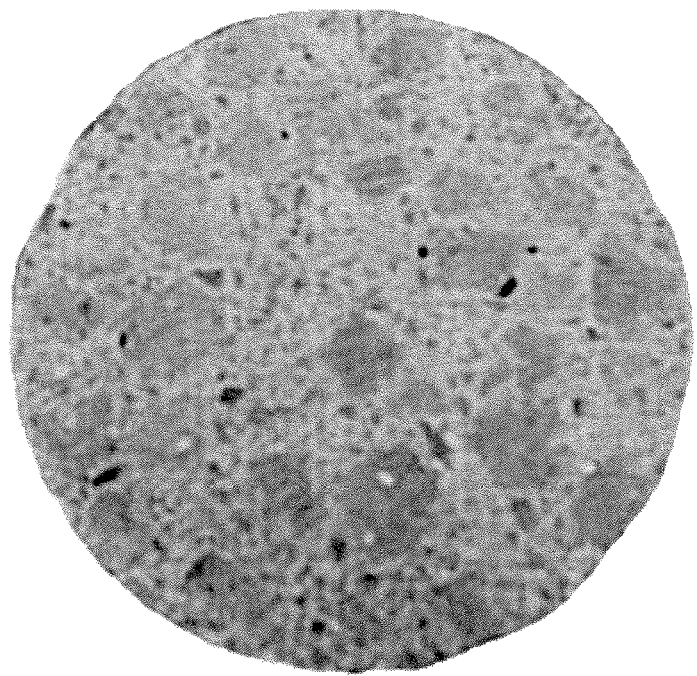
FIG. 12 shows the cross-section of concrete comprising the plastic aggregate of the invention.

In one embodiment the die shape is based on a notional primary shape. For example, the notional shape of the die form shown in FIG. 4 is square since the vertices of the star form a square shape. The walls of the dies between the vertices are made non-linear so as to promote a texturalised surface (see FIG. 9). In the case of the die of FIG. 4, a secondary shape, being triangular based, is applied to the primary shape. This produces a star-shaped die having four vertices and between each vertices a triangular-shape cut-out to produce an arc between each vertices.

In some embodiments the primary shape is a square, circle or oval.

In some embodiments the secondary shape applied to the primary shape is any shape so as to add vertices to the primary shape and/or create a non-linear perimeter between the vertices of the primary shape.

Such die shapes used with an appropriate land length as described above will provide an extruded plastic aggregate having a textured/irregular surface.

In one embodiment a complex shape is preferred as a die shape. For example, a shape such as a star shape as shown in FIG. 4 maximises drag, particularly at the points, and may act to minimise crack propagation in concrete due to the production of an extruded plastic aggregate lacking substantial planar surfaces.

Plastics aggregate formed by the extrusion process generally have a shape similar to that of the die shape. For example a triangular die having three sides and three corners will produce a plastics aggregate with generally three sides and three corners. It is however noted that the three sides will be highly textured or roughened and the three corners will not be precise and defined. This is an advantage of the present invention. This goes for similar shapes such as squares, irregular shapes, et cetera.

2.5 Cutting

In one embodiment the extrudate exiting the die is divided into appropriate lengths to form the extruded plastic aggregate.

In one embodiment the extrudate is divided into the appropriate lengths by cutting the extrudate.

For example, the extrudate is cut to the desired length by blades at the output of the extruder, which rotate about the die openings at a specific speed. The product is then cooled and dried, becoming rigid while maintaining porosity.

In one embodiment the blade is a serrated blade.

In one embodiment the blade is spaced from the facing of the die by about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2 mm, and useful ranges may be selected between any of these values.

In one embodiment the blades is positioned to have a leading and trailing edge, such that the leading edge is closer to the die face than the trailing edge of the knife.

In one embodiment the blade includes corrugations.

2.6 Cooling

In one embodiment, the method further comprises a step of cooling the extrudate after or during egress from the die.

The cooling can be carried out by contacting the aggregate with a high thermal capacity liquid, such as water. The water can be sprayed onto the aggregate, or the aggregate could be dipped into a bath containing water.

To control the rate of cooling the temperature of the water can be modulated. For example, for a high cooling rate through the use of cold water. The rate of cooling of the aggregate can be slowed by increasing the temperature of the water.

The cooling of the aggregate can take place in air. Again, the rate of cooling can be modified by controlling the temperature of the air for cooling of the aggregate.

Cooling in water tends to lead to rapid cooling of the aggregate owing to the high thermal heat transfer of water. Cooling in air tends to lead to slower rates of cooling of the aggregate owing to the lower heat transfer capability of air compared to water.

Slow cooling of the aggregate leads to an aggregate that either has no void spaces or at least substantially no void spaces.

Fast or rapid cooling of the aggregate leads to an aggregate with void spaces. The rate of cooling can be used to control the size and extensiveness of the void spaces in the aggregate.

This can be important depending on the nature of the concrete desired to be produced. For example, if a concrete with low weight, high thermal resistance is desired then rapid cooling is carried out as the aggregate will contain void spaces that will therefore reduce its weight and increase its thermal resistance.

In the alternative, if a high strength concrete is desired then the aggregate is cooled slowly. This has the effect of leading to an aggregate with little or no void spaces, increasing its density and leading to the production of a high strength concrete.

A high strength concrete is typically one with a compression strength of at least 20, 21, 22, 23, 24, 25, 26, 27, 28, 29 or 30 MPa, and useful ranges may be selected between any of these values (for example, about 20 to about 30, about 20 to about 28, about 20 to about 26, about 20 to about 27, about 20 to about 25, about 20 to about 23, about 21 to about 30, about 21 to about 28, about 21 to about 26, about 21 to about 25, about 22 to about 30, about 22 to about 27, about 22 to about 25, about 23 to about 30, about 23 to about 29, about 23 to about 25, about 24 to about 30, about 24 to about 28, about 24 to about 27, about 25 to about 30, about 25 to about 28, about 25 to about 26, about 26 to about 30, about 36 to about 29, about 26 to about 27, about 27 to about 30, about 27 to about 29, about 28 to about 30 MPa).

In an alternate embodiment the cooling is carried out by the addition of a powder selected from powders such as flyash or other pozzolanic materials, powdered glass, calcium carbonate, micro silica, sand and a combination thereof.

The inventors have determined that the application of a controlled rate of water (e.g. water mist) assists maintaining material separation immediately after the extrudate exits the extruder. This cooling water (e.g. water mist) is flashed off almost immediately but provides an opportunity for the hot aggregate aggregates to develop a thin skin within the highly humid pneumatic conveyor environment. Secondly, the water (e.g. water mist) application provides the mechanism for initial controlled cooling allowing internal gases to contract at a uniform rate, avoiding development of large void spaces.

The use of water mist starts the cooling process at a slow rate while allowing internal gases to contract at a uniform rate, avoiding development of large void spaces.

Gases are from residual contaminates, water, air, chemicals used as fillers in original containers.

In one embodiment at least about 0.1, 0.2, 0.3, 0.4, 0.5, 0.6, 0.7, 0.8, 0.9 or 1 L if liquid is used per 1.0 kg of plastic extrudate, and useful ranges may be selected between any of these values (for example, about 0.1 to about 1.0, about 0.1 to about 0.9, about 0.1 to about 0.8, about 0.1 to about 0.6, about 0.1 to about 0.5, about 0.2 to about 1.0, about 0.2 to about 0.9, about 0.2 to about 0.7, about 0.2 to about 0.6, about 0.2 to about 0.5, about 0.3 to about 1.0, about 0.3 to about 0.9, about 0.3 to about 0.8, about 0.3 to about 0.7, about 0.3 to about 0.6, about 0.3 to about 0.5, about 0.4 to about 1.0, about 0.4 to about 0.8, about 0.4 to about 0.6, about 0.4 to about 0.5, about 0.5 to about 1.0, about 0.5 to about 0.8, about 0.5 to about 0.7, about 0.7 to about 1.0, about 0.7 to about 0.8, about 0.8 to about 1.0, about 0.9 to about 1.0 L per 1.0 kg of plastic extrudate).

In one embodiment the dwell time of the extruded plastic aggregate in the misting steam is about 0.5, 1.0, 1.5, 2.0, 2.5, 3.0, 3.5 or 4 seconds, and useful ranges may be selected between any of these values.

In one embodiment the extruded plastic aggregate is subjected to cyclonic airing.

In one embodiment, the method further comprises the step of further cooling the extrudate using both air and a controlled cooling aid to promote uniform gas cell structure of the extrudate to achieve a specific gravity of about 0.80, 0.81, 0.82, 0.85, 0.87, 0.88, 0.89, 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19 or 1.20, and useful ranges may be selected between any of these values.

In one embodiment, the method further comprises the step of leaving a thin layer of the pozzolanic material fused into the extrudate surface after cooling.

In some embodiments, the process includes the addition of air and/or a controlled cooling aid to the hot but separated extruded plastic aggregate for further cooling. An example of a suitable a controlled cooling aid is a pozzolanic material such as flyash, powdered glass, calcium carbonate and micro silica.

In one embodiment flyash is used as the controlled cooling aid. Flyash has molecules approximately 10-200 μm in diameter allowing good thermal heat transfer while allowing the aggregate to degas sufficiently.

In one embodiment the residual flyash is removed and recycled via a pneumatic system.

In one embodiment the freshly extruded plastic aggregate cools at a rate of cooling as shown in Table 1 below.

TABLE 1

| Rate of cooling of the extruded plastic aggregate | | |
|---|---|---|
| Time from extrusion | Initial temperature (° C.) | Final temperature (° C.) |
| 0 to 10 sec | 160-200 (pref 180) | 120-160 (pref 140) |
| 10 sec top 2 min | 120-160 (pref 140) | 80-120 (pref 100) |
| 2 min to 5 min | 50-90 (pref 70) | 20-60 (pref 40) |

The inventors have determined that the use of a controlled cooling aid, such as a pozzolanic materials (e.g. fly ash) for controlled cooling leaves a thin layer of the pozzolanic material fused into the aggregate surface. This increases the surface area leaving a significantly larger surface for the cement paste to bond.

In one embodiment the increase in exposed surface is by a factor of 100, 200, 300, 400, 500, 600, 700, 800, 900, 1000, 2000, 3000, 4000, 5000, 6000, 7000, 8000, 9000, 10000 or 11000, and useful ranges may be selected between any of these values.

Additionally, the addition of a pozzolanic coating adds hydrophilic properties to the plastic aggregate.

In one embodiment controlling the cooling rate of the extruded plastic aggregate can be used to control the size of the air voids within the aggregate and therefore the density of the resulting extruded plastic aggregate.

Without wishing to be bound by theory, the inventors have determined that cooling the extruded plastic aggregate at a low rate allows the gases within the aggregate to escape leading to the collapse of air voids within the aggregate and the formation of a dense extruded plastic aggregate. In one embodiment, controlled cooling allows for the aggregate to densify by allowing entrained gases to contract continuously at a uniform rate. In one embodiment the density of the extruded plastic aggregate is about 300, 310, 320, 330, 340, 350, 360, 370, 380, 390, 400, 410, 420, 430, 440, 450, 460, 470, 480, 490, 500, 510, 520, 530, 540 or 550 kg/m$^3$, and useful ranges may be selected between any of these values.

In one embodiment the extruded plastic aggregate is cooled over a period of less than about 20, 19, 18, 17, 16, 15, 14, 13, 12, 11, 10, 9, 8, 7, 6, 5, 4, 3, 2 or 1 min, and useful ranges may be selected between any of these values, to produce a high rate cooled extruded plastic aggregate. In one embodiment the density of the high rate cooled extruded plastic aggregate is about 200, 300, 310, 320, 330, 340, 350, 360, 370, 380, 390 or 400 kg/m$^3$, and useful ranges may be selected between any of these values. In one embodiment the Shore Hardness D of the high rate cooled extruded plastic aggregate is approximately 20, 25, 30, 35, 40, 45, 50, 55, 60, 65 or 70, and useful ranges may be selected between any of these values.

In one embodiment the extruded plastic aggregate is cooled over a period of about 5, 10, 20, 30, 40, 50, 60 or 70 min, and useful ranges may be selected between any of these values, to produce a low rate cooled extruded plastic aggregate. In one embodiment the density of the low rate cooled extruded plastic aggregate is about 400, 410, 420, 430, 440, 450, 460, 470, 480, 490 or 500 kg/m$^3$, and useful ranges may be selected between any of these values. In one embodiment the Shore Hardness D of the high rate cooled extruded plastic aggregate is approximately 50, 55, 60, 65, 70, 75, 80, 85 or 90, and useful ranges may be selected between any of these values.

Figure 2:
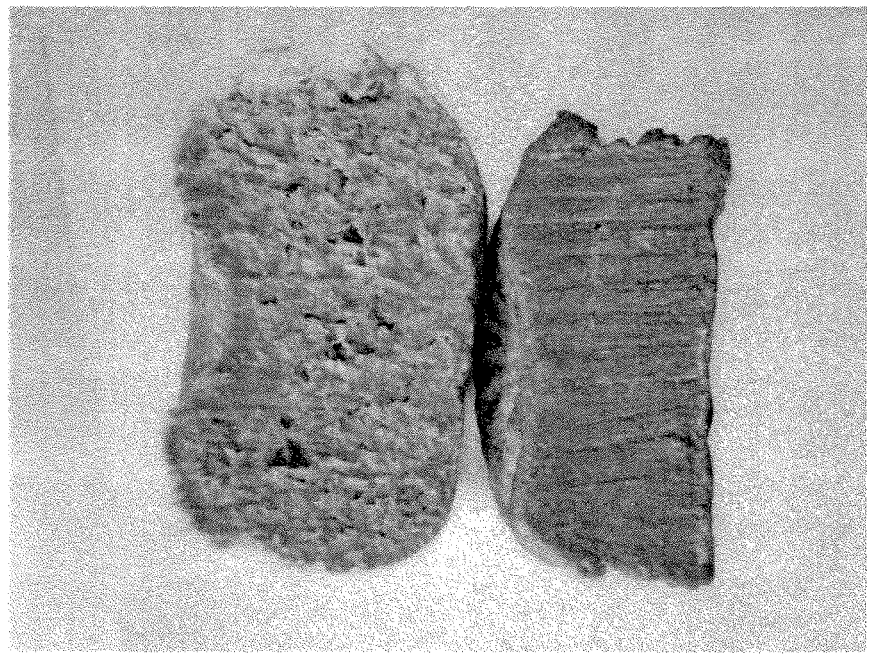
FIG. 2 shows a section through extruded plastic aggregates of the present invention. A low density aggregate produced by fast cooling is shown on the left hand side, and a high density aggregate produced by controlled slow cooling is shown on the right hand side.

FIG. 2 shows the structure of the fast cooled aggregate (on the left hand side) and the slow, controlled cooled aggregate (on the right hand side). The aggregate resulting from the slow, controlled cooling has a denser structure.

2.7 Additives

In one embodiment, the method further comprises the step of adding one or more additives to the extruding mixture. Examples of suitable additives include but are not limited to sand, glass, flyash, calcium carbonate and/or one or more ground pozzolanic materials.

In one embodiment the additive is added to the extruding mixture in an amount of at least about 1, 5, 10, 15, 20, 25, 30, 35 or 40% by weight of the extruded plastic aggregate, and useful ranges may be selected between any of these values.

In one embodiment the additive is glass. In one embodiment the glass particles are added at the beginning of the extruding process.

Without wishing to be bound by theory, the inventors have determined that the addition of micro ground particles such as fly ash, calcium carbonate and ground glass provide an emulsifying effect. The inventors have determined that this creates a more uniform fine gas cell structure than without use of fine particle inclusion.

In one embodiment, the method further comprises the step of providing polar substances to the surface of the plastic aggregates to improve an interface between the aggregates and a concrete mixture when the aggregates are added to a concrete mixture.

In an alternative embodiment the extruded plastic aggregate is treated to increase the surface energy of the aggregate. In preferred forms the extruded plastic aggregate is plasma treated. For example, by the use of flame treatment.

3. Extruded Plastic Aggregate

The present invention produces an extruded plastic aggregate.

In one embodiment the extruded plastic aggregate has a size of about 2, 3, 4, 5, 6, 7, 8, 9, 10, 11, 12, 13, 14, 15, 16, 17, 18, 19, 20, 21, 22, 23, 24, 25, 26, 27, 28, 29 or 30 mm, and useful ranges may be selected between any of these values.

The volume of the aggregate is many time that of the area. For example, for a 20 mm aggregate the surface area to volume ratio is about 1, 1.1, 1.2, 1.3, 1.4, 1.5, 1.6, 1.7, 1.8 or 1.9, and useful ranges may be selected between any of these values.

In one embodiment the extruded plastic aggregate has a specific gravity of about 0.90, 0.91, 0.92, 0.93, 0.94, 0.95, 0.96, 0.97, 0.98, 0.99, 1.00, 1.01, 1.02, 1.03, 1.04, 1.05, 1.06, 1.07, 1.08, 1.09, 1.10, 1.11, 1.12, 1.13, 1.14, 1.15, 1.16, 1.17, 1.18, 1.19 or 1.20, and useful ranges may be selected between any of these values.

In one embodiment the extruded plastic aggregate has a surface texture that is roughened and has a high surface area to promote both mechanical and molecular bonding.

An aspect of the present invention is to create surfaces of different area on the same piece of aggregate. This aspect assists to reduce the tendency for cleavage planes to line up in the cementitious mix. This reduction in cleavage plans increases the compressive strength of the concrete when mixed with said plastics aggregate.

This is achieved by extruding a plastics aggregate so that it is has many asymmetric qualities and rough surface areas. This is achieved by the parameters and variables of the extrusion process which will be described later.

A preferred shape of the plastics aggregate is cuboid. Both compressive strength and flexural strength may be improved by using cuboid aggregates, which may increase workabability and reduce bleeding and shrinkage.

In other embodiments the plastics aggregate may be alternatively shaped. Such shapes may include but are not limited to substantially spherical, irregular, ellipsoidal et cetera.

Preferably, the plastic aggregate comprises a high surface area to volume ratio.

The highly textured surface caused during egress from the die is due to rheology of the extrudate and the drag forces produced by the side wall of the die nozzle. The induced particle velocity decay creates a highly dislocated surface.

The benefits of this highly textured surface are twofold. Firstly the surface area is increased substantially providing more surface area for cement to bond to. Secondly the extreme surface disruption provides a mechanical bonding mechanism for the cement to form a captured bond around independently from the molecular bond.

Preferably rendered extruded the plastics aggregate has at least 80, 85, 90, 95 or 99% of the surface area as a textured or roughened surface, and useful ranges may be selected between any of these values, (for example, about 80 to about 99, about 80 to about 95, about 80 to about 90, about 85 to about 99, about 85 to about 90, about 90 to about 99, about 90 to about 95% of the surface area).

In further embodiments it is preferred that no more than 30, 25, 20, 15, 10, 5, 1% of the surface area is a flat linear surface, and useful ranges may be selected between any of these values, (for example 30 to about 1, about 30 to about 5, about 30 to about 10, about 30 to about 20, about 25 to about 1, about 25 to about 10, about 25 to about 15, about 25 to about 20, about 20 to about 1, about 20 to about 5, about 20 to about 10, about 15 to about 1, about 15 to about 10, about 10 to about 1, or about 10 to about 5% of the surface area).

The highly textured surface caused during egress from the die is due to rheology of the extrudate and the drag forces produced by the side wall of the die nozzle. The induced particle velocity decay creates a highly dislocated surface.

In one embodiment the extruded plastic aggregate has a textured/irregular surface. A textured or irregular surface is desired on the extruded plastic aggregate. In one embodiment the shape of the die is a "star" form as shown in FIG. 4. This star design creates a textured surface on the surface of the extruded plastic aggregate.

The star shaped die has two advantages. Firstly the texture does not occur equally on the same plan. This proves for a stronger aggregate as there is less tendency for texture to occur on the plastics aggregate plane.

The second advantage is that the star shaped die provides irregular nodules on the perimeter of the plastics aggregate. The irregular nodules provide a mechanical mechanism to reduce stress crack propagation in the cement.

Another aspect of the star shaped die design is that it allows for asymmetric symmetry.

Asymmetry reduces the chances of multiple plastics aggregates aligning in a concrete mixture; this may prevent crack propagation along a plane.

Asymmetry also creates a bend to be designed into the aggregate due to asymmetric sidewall drag. By having a bend in the plastics aggregate there is less tendency for the aggregate to pack in same plane in the cement mixture.

The effect of plastics aggregates packing in with a common plane can create cleavage planes to direct stress. This direction of stress can cause premature load failure. Ensuring these cleavage planes do not align assists to increase the resistance to force applied to the concrete i.e. making the concrete stronger.

4. Uses

The present invention is a plastics aggregate that can be used in as an at least partial replacement of normal aggregate to produce a lighter weight concrete. The use of a plastics aggregate reduces the weight of typical concrete since the plastic aggregate has a lower density compared to aggregate.

In one embodiment the concrete comprises about 5, 10, 15, 20, 25, 30, 35 or 40% by weight of the extruded plastic aggregate, and useful ranges may be selected between any of these values (for example, about 5 to about 40, about 5 to about 3, 0 5 to about 20, about 5 to about 10, about 10 to about 40, about 10 to about 35, about 10 to about 25, about 15 to about 40, about 15 to about 35, about 15 to about 30, about 20 to about 40, about 20 to about 35, about 20 to about 30, about 25 to about 40, about 25 to about 35, about 30 to about 40, about 35 to about 40% of the extruded plastic aggregate).

Typically lightweight plastic has lower compression strength than heavyweight concrete. However, it has been found that a particular configuration of plastics aggregate can increase the compressive strength of a lightweight concrete to similar values as a heavyweight concrete.

The plastic aggregate of the present invention achieves this by having a very high surface area to increase both the chemical and mechanical bonding of the plastics aggregate to the concrete mixture.

In addition, through the use of aggregate with void space a concrete product can be achieved that has improved thermal resistance, and is even more light weight. Such concrete will have a lower compressive strength than concrete made with aggregate that, for example, has no or little void space. However, this can be appropriate for applications that do not require a high compressive strength concrete and instead value light weight and/or thermal resistance (e.g. for insulation properties).

In one embodiment, the method further comprises the step of providing sand to the concrete mixture. In one embodiment the sand is added into the extruder in a low pressure section of the extruder.

In one embodiment, the method further comprises the step of providing the plastic aggregates as described above.

In one embodiment the plastic-aggregate-containing concrete comprises 100, 150, 200, 250, 300, 350, 400, 450 500, 550 or 600 kg of cement per $m^3$ of concrete, and useful ranges may be selected between any of these values.

In one embodiment the plastic-aggregate-containing concrete comprises 50, 100, 150, 200, 250, 300 or 350 kg of extruded plastic aggregate per $m^3$ of concrete, and useful ranges may be selected between any of these values.

In one embodiment the plastic-aggregate-containing concrete comprises 10 to 50% of water per kg of concrete, and useful ranges may be selected between any of these values.

In one embodiment the compressive strength of the concrete formed with the extruded plastic aggregate of the present invention is at least 10, 15, 20, 25, 30, 35, 40, 50 MPa, and useful ranges may be selected between any of these values, (for example, about 10 to about 50, about 10 to about 40, about 10 to about 30, about 10 to about 20, about 15 to about 50, about 15 to about 45, about 15 to about 37 about 15 to about 35, about 15 to about 34, about 15 to about 33, about 15 to about 32, about 15 to about 31, about 15 to about 30, about 15 to about 20, about 20 to about 50, about 20 to about 45, about 20 to about 40, about 20 to about 30, about 25 to about 50, about 25 to about 45, about 25 to about 35, about 30 to about 50, about 30 to about 40, about 40 to about 50 MPa).

In some embodiments the use of the extruded plastic aggregate may produce a concrete with a compressive of up to about 50, 60, 70, 80, 90 or 100 Mpa.

The plastic aggregate-containing concrete of the present invention can be used in a variety of uses, such as to form concrete for paths, roads, slabs, and pavers.

EXAMPLES

1. Evaluating the Effect of Process Conditions on the Properties of the Aggregate

Example 1

The purpose of this example was to
- evaluate the suitability of cooking extrusion equipment for recycled plastic extrusion,
- develop a faster process with a lower cost and greater scalability than a plastic extruder, and
- refine the processing variables around temperature and/or steam required to achieve a product in accordance with the present invention.

The process used a 400 kg bale of mixed industrial used plastic. This plastic derived from a plastic reclaim business and it is considered representative of a plastic waste stream.

The plastic was shredded in Te Puke, New Zealand using a single shaft shredder feeding to a granulator with a 3 mm screen.

The experiment was run in two batches for Examples 1 and 2.

The extrusion was carried out on a Wenger X-20 plant using dies of die of 15 mm diameter The knife used was a single blade spaced 0.01 mm from the face of the die and was run as slowly as possible.

A water bath was used to cool the extrudate as it exited the extruder. The water bath was aerated by hand paddle stirring.

The following die and extruder settings were tested as follows.

TABLE 2

Knife setting

| Trial | Space between knife and die facing (mm) |
|---|---|
| 1 | .05 |
| 2 | .09 |
| 3 | .09 |

TABLE 3

Extruder settings

| Setting | Value |
|---|---|
| extruder rpm | 380 |
| pre con rpm | 200 |
| feeder rpm | 16 |
| feed rate kg/hr | 112 |
| knife rpm | 130 |
| oil pump | Off |
| extruder load amps | 20 (Through Reeves Drive) |
| pressure psi | 450 |
| Water control | |
| barrel | 0 |
| pre con | 0 |
| Steam control | |
| pre con | 0 |

It was noted that the process produced good melt (estimated 99%), uniform pressure and a uniform extrudate.

Fly ash was investigated as a coating on the extruded plastic aggregate.

To determine the properties of the extruded plastic aggregate the following analyses were performed.

Bulk Density (using a glass test tube of known volume and weight.

Cross section (using a guillotine to cut open the extruded plastic aggregate to search for voids). This also provided a preliminary test of strength.

We determined that air drying or a fly-ash coating helps control the cooling of the aggregate to a uniform rate.

We also determined that water cooling of the extruded plastic aggregate forms a case hardening, preventing further contraction of internal gases and creating large void spaces, which remain in a state of vacuum. The resulting product was lighter but of a lower compressive strength.

Instead we found that air cooling is slower and leads to significantly reduced and more uniform internal voids and air pockets producing an extruded plastic aggregate with improved compressive strength.

We found that the raw material had a bulk density of 400 g/L. The extruded plastic aggregate had a bulk density of 375 g/L.

Example 2

The purpose of this example was to evaluate:
an 8 mm die with diameter 8 mm×70 mm,
a star form die being 10 mm×5 mm die land=approx 30 mm,
addition of fly ash to assess controlled cooling,
addition of sand to assess controlled cooling and coating,
a venting barrel section for venting volatile gases produced by shear, and
impingement of fly ash and sand with air gun.

The waste plastic source was recycled co-mingled plastic (janitorial grade) shredded and granulated to a particle size less than 3 mm as per Example 1. This size was chosen as it provided the highest surface area to volume ratio for thermal heat transfer ensuring higher chance of a substantially complete melt.

The particle size was needed to be less than 50% of the die open area to avoid blockage during processing.

The extrusion was carried out on a Wenger X-20 plant using a rotary knife and a vented barrel section. 2500 litre water tanks on the factory floor were used for product capture. Sand and fly ash were applied to the extrudate at extruder end.

The finished product was dropped into the water tank for an initial cooling. A catch funnel feeding the pneumatic conveyor was installed to feed the coating drum where sand was added at front end. The cooled product was then dropped into a secondary water tank.

A 4.5 mm×6 port die with a standard land length (approx. 5 mm) was trialled at the test end of the planned work to evaluate likely performance and output.

The following extruded plastic aggregates were produced.
2×20 litre bags of uncut extrudate, not fully melted or formed.
2×20 litre bags of 10/5×10-20 mm (nominal) square formed extruded plastic aggregate
2×20 litre bags of 12 mm×10-15 mm diameter extruded plastic aggregate
1×20 litre bag of 8-10 mm diameter×10-15 mm extruded plastic aggregate The die set up was as follows: 8 mm round die
2.5 mm space
1×20 mm backup
9 mm space
1×8 mm final
80 mm land
2×fixed blade The extruder settings were as follows.

TABLE 4

| Extruder set up. | |
|---|---|
| Setting | Value |
| extruder rpm | 340 |
| pre con rpm | 200 |
| feeder rpm | 11 |
| feed rate kg/hr | 80 |
| knife rpm | 130 |
| oil pump | Off |
| extruder load amps | 30 (Through Reeves Drive) |
| pressure psi | 800 |
| Water control | |
| barrel | 0 |
| pre conditioner Steam control | 0 |
| pre conditioner | 0 |

Extruded pellets were dissected and shown to be homogenous throughout indicating that the extrudate was fully melted in the extruder, had uniform pressure and uniform extrudate. The extrudate was liable to blowout and unstable if the barrel of the extruder was not cooled. We also noticed considerable smoking of the extrudate when it was too hot.

Initial cooling for 15 to 20 minutes by the addition of fly ash allowed the entrained volatile gases to be released from the extruded plastic aggregate showing that the fly ash acted as an excellent thermal insulator.

The long land worked well providing a highly textured surface on both the 8 mm and 10/5 mm profile die extrudate. The product bulk density increased from 380 to 450 kg/m³. This was due to the high product density developed with slow cooling overnight and allows for an amount of sand coating.

The sand applied was damp and had no adhesion indicating the importance of using dry sand for adhesion to the fresh extruded plastic aggregate and hence slow cooling.

Example 3

The purpose of this example was to evaluate new die designs to manufacture aggregate suitable for use in cementations mix designs. The following dies were evaluated:
12/6×30 mm land
4.5 mm×6 port×70 mm land We also evaluated:
various types of coatings (black sand, play centre sand, East Coast Sand, saw dust, aluminium filings, steel filings),
application of sand by grit blasting sand versus feeding sand at the exit of the extruder,
virgin HDPE and LDPE material,
sand cooling using cooling drum, and
the addition of Calcium Carbonate as a hardening agent.

The waste plastic source was recycled co-mingled plastic (janitorial grade) shredded and granulated to a particle size less than 3 mm as per Example 1 and 2.

A Wenger X20 extruder was used with a rotary knife having two blades for cutting the extrudate to form the aggregate. Bins containing the coating material was used to capture the product.

The first test was run on the 12/6 star form die. We found that the 10/5×30 mm die of Example 2 has a more pronounced textured finish.

Sand was applied using grit blasting guns.

Wood saw dust was applied by hand at the extruder exit point. Application was very easy and the dust adhered.

Aluminium and steel filings were applied using a bucket. This material did not stick well to the hot extrudate. Hand pressure was applied which gave modest binding of some of the coating material.

The next die tested was the 4.5 mm×6 port×70 mm land die. This test was unsuccessful. We were unable to achieve any stability by both speed and temperature control variation. Constant surging was experienced causing a splattering rather than extruding effect at the die head.

We then tested the use of a 12/6×30 mm die with $CaCO_3$ blended with the co-mingled granulated plastic material. The extrudate displayed good characteristics and the $CaCO_3$ coated well with the sand being hand applied.

The feed material was then changed to virgin high density polyethylene (HDPE). The 12/6×30 mm land die was used. The product extruded with control. We found that expansion was significantly higher than co-mingled waste plastic.

We then used a food grade die (4.5 mm die having a short land length of 5 mm). The virgin LDPE was used as the feed material. The material was hard to control and the material had a very fine flour consistency. This caused inconsistent flow through the extruder contributing to the lack of uniformity.

Die set up #1
2.5 mm space
12×10 mm backup
5 mm space
1×20 mm back up
9 mm space
6×4.5 mm final, 3.5 mm land
1×fixed blade The extruder settings were as follows.

TABLE 5

| Extruder settings | |
| --- | --- |
| Setting | Value |
| extruder rpm | 340 |
| pre con rpm | 200 |
| feeder rpm | 10 |
| feed rate kg/hr | 60 |
| knife rpm | |
| oil pump | Off |
| extruder load amps | 30 (Through Reeves Drive) |
| pressure psi | 600 |
| Water control | |
| barrel | 0 |
| pre con | 0 |
| Steam control | |
| pre con | 0 |

Full melt of co-mingled waste occurred in less than 1 minute with uniform pressure and uniform extrudate. The extrudate was not hot enough to get ideal sand adherence and we found that a longer land length is required for improved surface texture.

The raw material bulk density was 400 g/L.

A second die setup was then investigated.

Die set up #2
2.5 mm space
1×20 mm backup
12×10 mm backup
9 mm space
1×6×12 mm Star. 30+70 mm land
1×fixed blade The extruder settings were also adjusted by increasing the feeder revolutions per minute (rpm), increasing the feed rate and increasing the pressure as shown in Table 5.

TABLE 6

| Extruder settings | |
| --- | --- |
| Setting | Value |
| extruder rpm | 340 |
| pre con rpm | 200 |
| feeder rpm | 13 |
| feed rate kg/hr | 80 |
| knife rpm | — |
| oil pump | Off |
| extruder load amps | 30 (Through Reeves Drive) |
| pressure psi | 900 |
| Water control | |
| barrel | 0 |
| pre condition | 0 |
| Steam control | |
| pre condition | 0 |

Using these conditions, full melt and a uniform and textured extrudate was achieved. Good sand adherence to the hot textured surface was observed.

The 12/6×30 mm die performed well, however the surface texturing was not as pronounced as for the 10/5×30 mm. It is surmised the different open area to sidewall area ratio effects rheology. The land length should be approx. 45 mm on the 12/6 die to give an equivalent ratio.

The sand blasting guns were mounted directly opposed. The reason being not to damage to soft extruded plastic aggregate by blasting against the pneumatic conveyor side walls. The sand blasting provides a higher degree of sand impingement over a larger range of operating conditions.

The 4.5 mm die with 70 mm land did not perform well. The problem has been identified as the land length was too long.

Example 4

The plastic aggregate resulting from the test set up of Example 3 (i.e. 12/6×30 mm land with 4.5 mm×6 port×70 mm land) was used in concrete and the compression strength was tested.

Concrete samples comprising Greywacke aggregate (GW10) and PAP7 Kaipara sand, Portland cement, water and sika and 2.5 kg of the plastic aggregate (PA) was prepared in quadruplicate with an average mass of 3.08 kg.

One sample was subjected to a compression test at 7 days, the second sample at 14 days and the third sample of four at 21 days.

TABLE 7

Composition of samples for testing

| Aggregate | | | | | | | | |
|---|---|---|---|---|---|---|---|---|
| GW10 kg | PAP7 kg | PA kg | Sand kg | Cement kg | Sika kg | Water kg | Sika mL | Cement/ water |
| 3 | 6 | 2.5 | 3.75 | 3.15 | 0.35 | 1.47 | 8 | 0.42 |
| 3 | 6 | 2.5 | 3.75 | 3.15 | 0.35 | 1.47 | 8 | 0.42 |
| 3 | 6 | 2.5 | 3.75 | 3.15 | 0.35 | 1.47 | 8 | 0.42 |
| 3 | 6 | 2.5 | 3.75 | 3.15 | 0.35 | 1.47 | 8 | 0.42 |

TABLE 8

Results of compression testing at 7, 14 and 21 days

| Mix Density (Kg/m$^3$) | Mix mass kg | 7 day MPa | 14 day MPa | 21 day MPa |
|---|---|---|---|---|
| 2022.8 | 3.107 | 22 | | |
| 2022.8 | 3.074 | | 21.41 | |
| 2022.8 | 3.06 | | | 23.42 |
| 2022.8 | 3.07 | | | |

The concrete samples containing plastic aggregate gave compression test results of 22, 21.41 and 23.42 MPa at 7, 14 and 21 days respectively as shown in Table 7 above.

Where in the foregoing description reference has been made to elements or integers having known equivalents, then such equivalents are included as if they were individually set forth.

Although the invention has been described by way of example and with reference to particular embodiments, it is to be understood that modifications and/or improvements may be made without departing from the scope or spirit of the invention.

2. Evaluating the Properties of Concrete Comprising Natural Crushed Aggregates and Plastic Aggregates The following examples demonstrate the ability to tailor properties of concrete comprising the plastic aggregate of the invention, by controlling the properties of the plastic aggregate, for example using additives and coatings. These examples involve the preparation of concrete cylinders with ingredients selected from the group comprising cement, water, aggregates with 20 mm or 10 mm diameter, plastic aggregates of the invention (with diameters of 4, 8, 12/6 or 15 mm), Pap7 aggregates, sand, a combination of plastic aggregate and sand, a water reducer and micro silica.

Example 5

This example demonstrates the compression strength and density of concrete comprising plastic aggregates of the invention compared to a standard Atlas concrete as the control.

Samples of concrete comprising plastic aggregate and the ingredients as shown in Table 10 were prepared in triplicate (M2A, M2B and M2C) below. The Atlas concrete control was also prepared as shown in Table 9.

TABLE 9

Concrete samples prepared

| | Atlas Standard (Control) | Plastic aggregate samples M2A-C |
|---|---|---|
| Trial Volume (ltrs) | 10 L | 10 L |
| Cement | 2.3 kg | 3.7 kg |
| Water | 1.6 L | 1.6 L |
| 20 mm Agg | 6.7 kg | |
| 10 mm Agg | 3.3 kg | |
| Plastic aggregate 8 mm | | 2.6 kg |
| Pap7 | 5.0 kg | 5.0 kg |
| Sand | 4.5 kg | 4.5 kg |
| Water Reducer | 8 mls | 8 mls |

TABLE 10

Compression strength test results comprising plastic aggregate as compared to the Atlas standard

| | Atlas Standard (Control) | M2A | M2B | M2C |
|---|---|---|---|---|
| Trial Results | | | | |
| Slump (mm) | | | | |
| Air Content (%) | | | | |
| Cylinder weight | 3.566 | 2.633 | 2.651 | 2.658 |
| Cylinder volume | 1.478 | 1.478 | 1.565 | 1.567 |
| Cylinder Results (100 mm) | | | | |
| 7-day Strength (MPa) | 15.26 | 11.26 | | |
| 7-day Density (kg/m$^3$) | 2.413 | 1.781 | | |
| 28-day Strength (MPa) | | | 14.96 | 14.69 |
| 28-day Density (kg/m$^3$) | | | 1.693 | 1.696 |

As shown in Table 10, concrete sample 1 comprising the plastic aggregate resulted in a lower strength and density than the Atlas standard used as the control.

Example 6

This example shows the effect of adding 5% $CaCO_3$ to the plastic aggregate at melt, on the density and the compression strength of the resulting concrete produced.

Samples of concrete comprising plastic aggregate, 5% CaCO3 and the ingredients as shown in Table 11, were prepared in triplicate (M3A, M3B and M3C).

TABLE 11

Concrete samples prepared

| | Plastic aggregate samples with 5% $CaCO_3$ M3A-C |
|---|---|
| Trial Volume (ltrs) | 10 L |
| Cement | 3.5 kg |
| Water | 1.6 L |
| 10 mm Agg | 3.0 kg |
| Plastic aggregate 12/6 mm | 2.5 kg |
| Pap7 | 6.0 kg |

TABLE 11-continued

Concrete samples prepared

| | Plastic aggregate samples with 5% CaCO$_3$ M3A-C |
|---|---|
| Sand | 3.75 kg |
| Water Reducer | 8 mls |

The properties of the Atlas concrete standard prepared in example 5 was compared to the properties of the concrete samples M3A-M3C prepared in this example.

TABLE 12

Compression strength test results for concrete samples comprising CaCO$_3$ and plastic aggregate as compared to the Atlas standard

| | Atlas Standard (Control) | M3A | M3B | M3C |
|---|---|---|---|---|
| Trial Results Slump (mm) Air Content (%) | | | | |
| Cylinder weight | 3.566 | 2.955 | 3.069 | 3.011 |
| Cylinder volume | 1.478 | 1.447 | 1.567 | 1.567 |
| Cylinder Results (100 mm) | | | | |
| 7-day Strength (MPa) | 15.26 | 15.49 | — | — |
| 7-day Density (kg/m$^3$) | 2.413 | 2.042 | — | — |
| 28-day Strength (MPa) | — | — | 21.01 | 20.1 |
| 28-day Density (kg/m$^3$) | — | — | 1.959 | 1.922 |

As shown in Table 12, the samples comprising CaCO3 had comparable strength and density at 7 days as the Atlas concrete standard. Compared to samples M2A-M2C prepared in Example 5, these samples were more dense and had a higher compression strength after 28 days.

Example 7

This example shows the effect of using flame treated plastic aggregate on the properties of the concrete produced.

Samples of concrete comprising flame treated plastic aggregate (M4) were prepared in duplicate (M4A and M4B) as shown in Table 13 below. Another sample comprising flame treated plastic aggregate (M5) was also prepared.

TABLE 13

Concrete samples prepared

| | Atlas Standard (Control) | Flame treated plastic aggregate samples M4A-B | Flame treated plastic aggregate sample M5 |
|---|---|---|---|
| Trial Volume (ltrs) | 10 L | 10 L | 10 L |
| Cement | 2.3 kg | 3.7 kg | 3.15 kg |
| Water | 1.6 L | 1.6 L | 1.6 L |
| 20 mm Agg | 6.7 kg | | |

TABLE 13-continued

Concrete samples prepared

| | Atlas Standard (Control) | Flame treated plastic aggregate samples M4A-B | Flame treated plastic aggregate sample M5 |
|---|---|---|---|
| 10 mm Agg | 3.3 kg | | 3.0 kg |
| Plastic aggregate 8 mm | | 2.6 kg | |
| Plastic aggregate 12/6 mm | | | 2.5 kg |
| Pap7 | 5.0 kg | 5.0 kg | 6.0 kg |
| Sand | 4.5 kg | 4.5 kg | 3.75 kg |
| Water Reducer | 8 mls | 8 mls | 8 mls |
| Micro silica | | | 0.35 kg |

TABLE 14

Compression strength test results for concrete samples comprising flame treated plastic aggregate as compared to the Atlas standard

| | Atlas Standard (Control) | M4A | M4B | M5 |
|---|---|---|---|---|
| Trial Results | | | | |
| Cylinder weight | 3.566 | 2.691 | 2.715 | |
| Cylinder volume | 1.478 | 1.564 | 1.567 | |
| Cylinder Results (100 mm) | | | | |
| 7-day Strength (MPa) | 15.26 | 12.83 | | |
| 7-day Density (kg/m$^3$) | 2.413 | 1.721 | | |
| 14-day Strength (MPa) | | | 15.32 | |
| 14-day Density (kg/m$^3$) | | | 1.733 | |
| 28-day Strength (MPa) | | | | 20.35 |

The results shown in Table 14 indicate that sample M4A has a lower 7 day strength and density than the Atlas standard.

The results of the compression test on sample M5 which comprises flame dried aggregate as well as micro silica shows that this sample has a higher compression strength than the Atlas standard, and a higher compression strength than the other plastic aggregate samples M2B, M2C and M3B and M3C.

Example 8

This example shows the effect of flame treating plastic aggregates comprising 5% CaCO$_3$, on the resulting concrete produced.

Samples of concrete comprising flame treated plastic aggregate, 5% CaCO3 and the ingredients as shown in Table 15, were prepared in triplicate (M6A, M6B and M6C).

TABLE 15

Concrete samples prepared

| | Flame treated plastic aggregate samples with 5% CaCO$_3$ M6A-C |
|---|---|
| Trial Volume (ltrs) | 10 L |
| Cement | 3.5 kg |
| Water | 1.6 L |
| 20 mm Agg | |
| 10 mm Agg | 3.0 kg |
| Plastic aggregate 12/6 mm | 2.5 kg |
| Plastic aggregate 15 mm | |
| Pap7 | 6.0 kg |
| Sand | 3.75 kg |
| Water Reducer | 8 mls |

TABLE 16

Compression strength test results for concrete samples comprising flame treated plastic aggregate and CaCO$_3$ as compared to the Atlas standard

| | Atlas Standard (Control) | M6A | M6B | M6C |
|---|---|---|---|---|
| Trial Results | | | | |
| Cylinder weight | 3.566 | 3.032 | 3.033 | 3.105 |
| Cylinder volume | 1.478 | 1.564 | 1.565 | 1.565 |

TABLE 16-continued

Compression strength test results for concrete samples comprising flame treated plastic aggregate and CaCO$_3$ as compared to the Atlas standard

| | Atlas Standard (Control) | M6A | M6B | M6C |
|---|---|---|---|---|
| Cylinder Results (100 mm) | | | | |
| 7-day Strength (MPa) | 15.26 | 17.42 | | 22.00 |
| 7-day Density (kg/m$^3$) | 2.413 | 1.939 | | 1.984 |
| 14-day Strength (MPa) | | | 21.50 | |
| 14-day Density (kg/mm$^3$) | | | 1.938 | |

Example 9

This example shows the properties of concrete comprising plastic aggregates of the invention, which have been flame treated and coated with fly ash. This example also shows that by adjusting the size of the plastic aggregates and the quantities of other ingredients in the concrete mixture, the compression strength of the resulting concrete can be tailored for different applications.

Five samples (M7-M11) of concrete comprising flame-treated fly-ash coated plastic aggregate were prepared according to Table 16 below.

M7-M11 all comprise flame-treated fly-ash coated plastic aggregates of the invention.

Table 17. Concrete samples prepared

TABLE 17

Concrete samples prepare

| | M7 | M8 | M9 | M10 | M11 |
|---|---|---|---|---|---|
| Trial Volume (ltrs) | 10 L | 10 L | 10 L | 10 L | 10 L |
| Cement | 3.15 kg | 3.15 kg | 3.75 | 3.70 kg | 3.7 kg |
| Water | 1.6 L | 1.5 L | 1.65 L | 1.70 L | 1.7 kg |
| 20 mm Agg | | | | | 1.0 kg |
| 10 mm Agg | 2.5 kg | 1.88 kg | 3.0 kg | | |
| Plastic aggregate 4 mm | | | | | 1.0 kg |
| Plastic aggregate 8 mm | | 1.85 kg | | 2.2 kg | 1.5 kg |
| Plastic aggregate 12/6 mm | 2.5 kg | 0.35 kg | | | |
| Plastic aggregate 15 mm | | | 1.0 kg | 1.0 kg | 1.0 kg |
| Pap7 | 6.0 kg | 5.50 kg | 5.50 kg | 5.50 kg | 3.0 kg |
| Sand | 3.75 kg | 3.75 kg | 3.75 kg | 3.75 kg | 2.8 kg |
| Water Reducer | 8 mils | 8 mils | 8 mils | 8 mils | 8 mils |
| Micro Sliica | 0.35 kg | 0.5 kg | | | |

TABLE 18

Compression strength test results for concrete samples comprising flame-treated and fly ash-coated plastic aggregates of the present invention

|  | M7 | M8 | M9 | M10 | M11 |
|---|---|---|---|---|---|
| Trial Results |  |  |  |  |  |
| Cylinder weight | 3.034 | 2.971 | 2.950 | 2.900 | 3.100 |
| Cylinder volume | 1.932 | 1.891 | 1.866 | 1.790 |  |
| Cylinder Results (100 mm) |  |  |  |  |  |
| 7-day Strength (MPa) | 16.46 | 15.91 |  |  | 23.5 |
| 28-day Strength (MPa) |  |  | 29.48 |  | 29.48 |
| 60-day Strength (MPa) |  |  |  |  | 33.42 |

The results shown in Table 18 indicate that a high compression strength concrete (M11) can be achieved by including a mixture of different sized plastic aggregates in the concrete mixture.

When the surface of the plastic aggregate was modified by flame treating and coating with fly ash the compressive strength was increased. Without wishing to be bound by theory, the inventors believe that the fly-ash coating provides improved bonding between the plastic aggregate and the cement paste.

Example 10

This example shows that concrete comprising plastic aggregates of the present invention is able to carry a load after maximum stress is achieved.

Concrete samples M9 and M11 were prepared according to the previous example and the compression strength of these concrete cylinders was tested 28 days and 7 days after preparation respectively.

Figure 5:
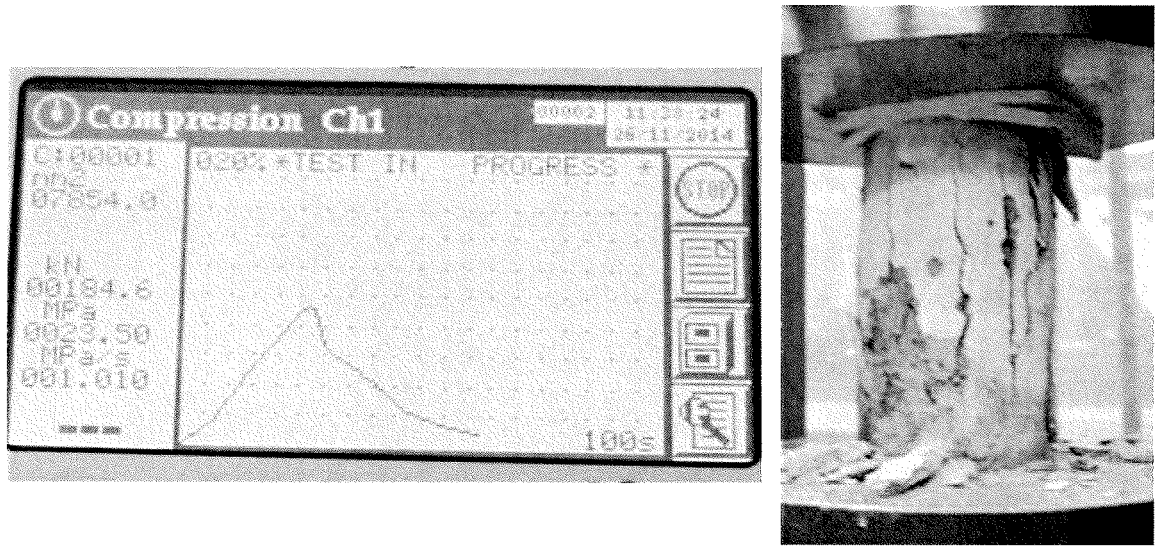
FIGS. 5 and 6 shows the ability of concrete comprising the plastic aggregate of the present invention to carry a load after maximum stress is achieved.
Figure 6:
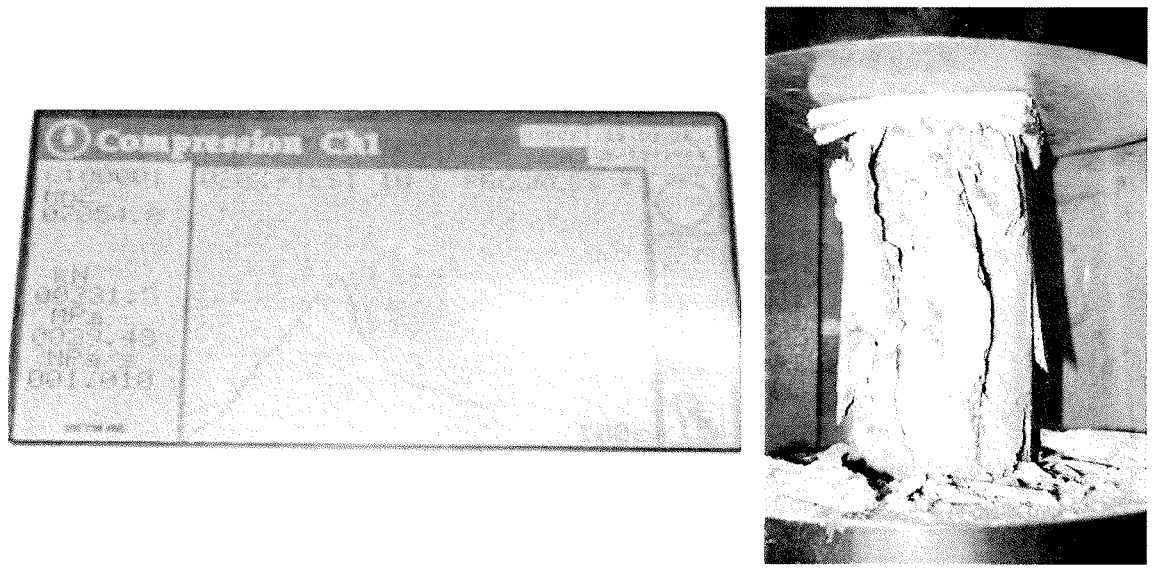

As shown in FIG. 5 the compression strength of sample M11 was 23.5 MPa after 7 days. FIG. 6 shows that the compression strength of sample M9 was 29.48 MPa after 28 days.

Figure 7:
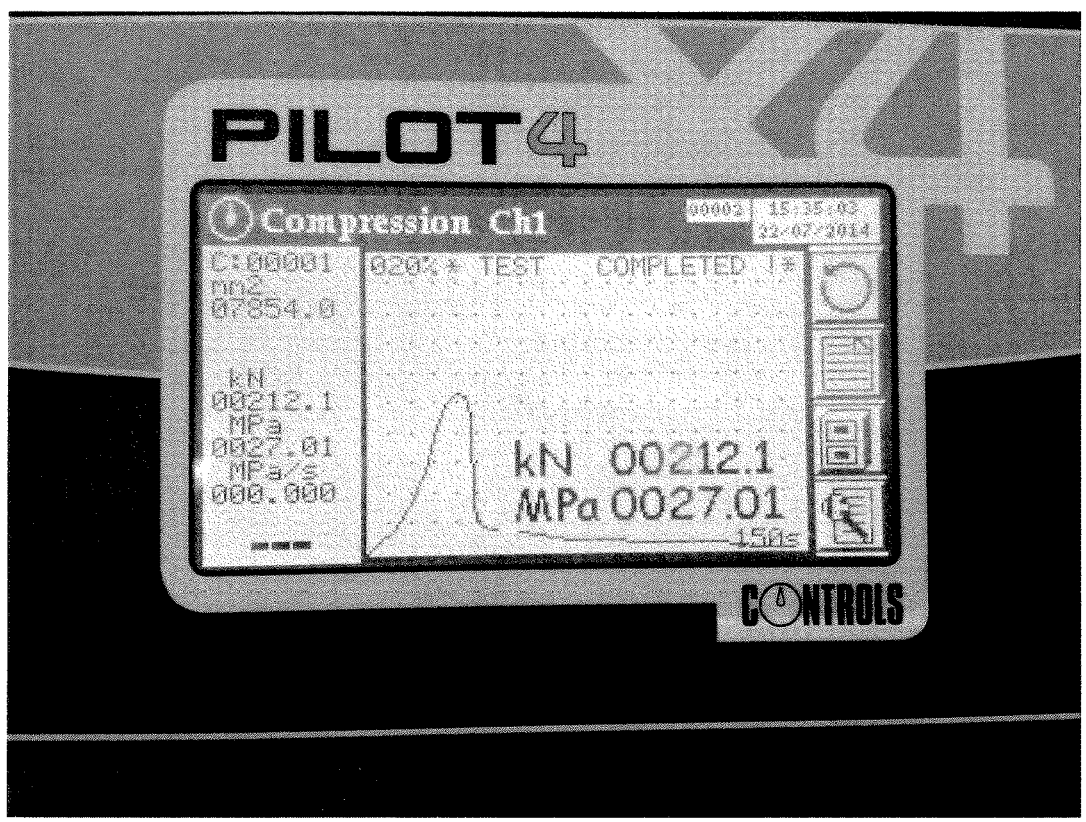
FIG. 7 shows the inability of concrete without the plastic aggregate of the present invention to carry a load after maximum stress is achieved.

Both FIGS. 5 and 6 show that once maximum stress is achieved, concrete samples comprising the plastic aggregate of the invention are able to continue to carry a load and are not brittle. This is in contrast to the behaviour of concrete without the plastic aggregate (FIG. 7).

Example 12

This example shows that the properties of the plastic aggregate can be varied by adjusting the process parameters.

Table 18 shows the dimensions, weight, die used for extrusion, coating, specific density, specific gravity and surface energy of plastic aggregates.

TABLE 19

Examples of aggregates produced by different process parameters

| Sample number | Dimensions (mm) | Weight | Die (mm) | Coating | Specific density | Specific gravity |
|---|---|---|---|---|---|---|
| P1 | 10 × 15 | 0.87 | 8 | ECS | 0.42 | 0.92 |
| P2 | 10 × 10 × 15 | 1.63 | 12/6/4 | ECS | 0.45 | 0.92 |
| P3 | 25 × 15 | 4.67 | 15 | None | 0.35 | 0.92 |
| P4 | 8 × 8 × 15 | 0.61 | 10/5/4 | None | 0.45 | 0.92 |
| P5 | 6 × 6 | 0.41 | 4.5 | None | 0.40 | 0.92 |
| P6 | 10 × 10 × 40 | 4.06 | 12/6/4 | ECS | 0.45 | 0.92 |
| P7 | 8 × 8 × 10 | 0.54 | 10/5/4 | Fly ash | 0.45 | 0.92 |
| P8 | 10 × 10 × 15 | 1.89 | 12/6/4 | ECS | 0.45 | 0.92 |
| P9 | 4 diameter | 0.02 | 2 | None | 0.35 | 0.80 |
| P10 | 20 diameter | 2.16 | 15 | None | 0.38 | 0.92 |

Table 20 shows some other properties of plastic aggregates including surface energy, hardness, compressive strength, filler and surface texture.

TABLE 19

Examples of aggregates produced using different process parameters

| Sample number | Surface energy | Hardness SD | Compressive strength | Filler | Surface texture |
|---|---|---|---|---|---|
| P1 | 24 | 59 | 65 | — | High |
| P2 | 35 | 60 | 64 | — | Medium |
| P3 | 24 | 35 | 20 | — | High |
| P4 | 35 | 55 | 35 | — | High |
| P5 | 26 | 50 | 35 | — | Low |
| P6 | 30 | 50 | 35 | — | Medium |
| P7 | 42 | 50 | 35 | — | High |
| P8 | 30 | 50 | 35 | CaCO$_3$ | Medium |
| P9 | 25 | 15 | 15 | LDPE | Smooth |
| P10 | 25 | 35 | 35 | — | Smooth |

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method of manufacturing an extruded plastic aggregate for use in a concrete product that, in use, enables production of a concrete product having a desired compressive strength, the method comprising
providing a granulated waste plastic material,
introducing the granulated waste plastic material into an extruder having a die, the die having a ratio of die nozzle open area to die land area of about 1:10 to about 1:40,
extruding the granulated waste plastic material through the extruder to generate an extruded plastic aggregate,
treating the extruded plastic aggregate by coating the plastic aggregate with a controlled cooling aid, in the form of powder, to control cooling of the extruded plastic aggregate;
to provide the extruded plastic aggregate for use in the concrete product, the extruded plastic aggregate having a size of 2 to 30 mm and a surface texture that is macroscopically roughened and a surface area adapted to promote both mechanical and/or molecular bonding.

2. The method of claim 1 wherein one or more additives are added to the granulated waste plastics during melt.

3. The method of claim 2 wherein the one or more additives comprises sand, pozzolanic materials, calcium carbonate, micro silica or glass.

4. The method of claim 3 wherein the pozzolanic material is fly ash.

5. The method of claim 2 wherein the additive is calcium carbonate.

6. The method of claim 1 wherein the powder is applied to the extruded plastic aggregate immediately after or during egress from the die.

7. The method of claim 1 wherein the controlled cooling aid comprises sand, pozzolanic materials, calcium carbonate, micro silica or glass.

8. The method of claim 7 wherein a cooling powder is a pozzolanic material.

9. The method of claim 8 wherein the pozzolanic material is fly ash.

10. The method of claim 8 wherein the method further comprises the step of leaving a layer of the pozzolanic material fused into the surface of the extruded plastic aggregate after cooling.

11. The method of claim 6 wherein the extruded plastic aggregate is cooled for about 1 minute to 10 minutes to yield an aggregate.

12. The method of claim 11 wherein the aggregate has a density of about 200 kg/m$^3$ to about 250 kg/m$^3$.

13. The method of claim 6 wherein the extruded plastic aggregate is cooled for 10 minutes to about 70 minutes to yield an aggregate.

14. The method of claim 13 wherein the aggregate has a density of about 250 kg/m$^3$ to about 400 kg/m$^3$.

15. The method of claim 1 wherein the controlled cooling of the aggregate leads to the absence, or substantial absence, of void spaces in the aggregate.

16. The method of claim 1 wherein the method further comprises the step of further cooling the extruded plastic aggregate using both air and a controlled cooling aid, to promote uniform gas cell structure of the extrudate to achieve a specific gravity of about 0.80 to 1.15.

17. The method of claim 1 wherein the extruder is a food extruder.

18. The method of claim 1 wherein, relative to a 20 mm aggregate, the extruded plastic aggregate comprises a surface area to volume ratio of about 1 to 1.9.

* * * * *

UNITED STATES PATENT AND TRADEMARK OFFICE
CERTIFICATE OF CORRECTION

PATENT NO. : 11,498,870 B2
APPLICATION NO. : 15/529388
DATED : November 15, 2022
INVENTOR(S) : Peter Barrow, Andrew Ferrier and Peter Hutchinson It is certified that error appears in the above-identified patent and that said Letters Patent is hereby corrected as shown below:

On the Title Page

For the (71) Applicant, please remove "MNZ HOLDINGS LIMITED" and insert --ENVIROPLAZ INTERNATIONAL HOLDINGS LIMITED--.

Signed and Sealed this
Fourteenth Day of February, 2023

Katherine Kelly Vidal
*Director of the United States Patent and Trademark Office*